United States Patent
Seidel et al.

(10) Patent No.: US 10,459,077 B2
(45) Date of Patent: Oct. 29, 2019

(54) SET-UP FOR MEASURING A ROTATIONAL SPEED, IN PARTICULAR, OF A TURBOCHARGER OF A MOTOR VEHICLE

(71) Applicant: Robert Bosch GmbH, Stuttgart (DE)

(72) Inventors: Juergen Seidel, Baltmannsweiler (DE); Stephan Bannwarth, Darmstadt (DE); Klaus Lerchenmueller, Rettenberg (DE)

(73) Assignee: Robert Bosch GmbH, Stuttgart (DE)

( * ) Notice: Subject to any disclaimer, the term of this patent is extended or adjusted under 35 U.S.C. 154(b) by 488 days.

(21) Appl. No.: 15/223,376

(22) Filed: Jul. 29, 2016

(65) Prior Publication Data

US 2017/0031014 A1    Feb. 2, 2017

(30) Foreign Application Priority Data

Jul. 31, 2015 (DE) .................. 10 2015 214 588

(51) Int. Cl.
  *G01S 13/58* (2006.01)
  *G01M 15/02* (2006.01)
  *G01S 13/88* (2006.01)
  *G01S 7/02* (2006.01)

(52) U.S. Cl.
  CPC ............. *G01S 13/58* (2013.01); *G01M 15/02* (2013.01); *G01S 13/88* (2013.01); *G01S 2007/027* (2013.01)

(58) Field of Classification Search
  CPC ........ G01S 13/58; G01S 13/88; G01S 13/881; G01S 2007/027; G01M 15/00; G01M 15/02; G01M 15/046
  See application file for complete search history.

(56) References Cited

U.S. PATENT DOCUMENTS

| | | | |
|---|---|---|---|
| 2010/0039288 A1* | 2/2010 | Mitchell | G01K 1/024 340/870.02 |
| 2010/0254104 A1* | 10/2010 | Blake, III | H05K 5/066 361/757 |
| 2010/0332180 A1* | 12/2010 | Seidel | F02D 41/0007 702/145 |

(Continued)

FOREIGN PATENT DOCUMENTS

DE    102012200261 A1    7/2013

*Primary Examiner* — Bernarr E Gregory
*Assistant Examiner* — Daniel P Malley, Sr.
(74) *Attorney, Agent, or Firm* — Norton Rose Fulbright US LLP; Gerard Messina

(57) ABSTRACT

For a set-up for measuring a rotational speed of a turbocharger of a motor vehicle, including at least one antenna for generating and/or receiving electromagnetic radiation and an electronic module having at least one electric and/or electronic component and being electrically connected to the antenna. The set-up further includes a housing shell made at least partially of laser-absorbing material and having an inner chamber, and a housing cover, which rests on at least one laser-absorbing contact surface of the housing shell and covers the inner chamber of the housing shell at least partially, and at least sections of which are made of material transparent to laser radiation; the antenna and the electronic module being situated in the inner chamber of the housing shell, and at least sections of the housing cover being welded to the housing shell at the at least one contact surface using a laser-welded seam.

23 Claims, 3 Drawing Sheets

(56) References Cited

U.S. PATENT DOCUMENTS

| | | | |
|---|---|---|---|
| 2012/0060600 A1* | 3/2012 | Reimelt | G01F 23/284 73/290 V |
| 2014/0366632 A1* | 12/2014 | Lerchenmueller | F01D 17/06 73/509 |
| 2015/0114096 A1* | 4/2015 | Eichel | G01S 7/415 73/114.25 |
| 2015/0331087 A1* | 11/2015 | Philipp | H05K 5/0069 342/175 |
| 2016/0146658 A1* | 5/2016 | Littleford | G01F 23/284 342/124 |

* cited by examiner

SET-UP FOR MEASURING A ROTATIONAL SPEED, IN PARTICULAR, OF A TURBOCHARGER OF A MOTOR VEHICLE

CROSS REFERENCE

The present application claims the benefit under 35 U.S.C. § 119 of German Patent Application No. DE 102015214588.3 filed on Jul. 31, 2015, which is expressly incorporated herein by reference in its entirety.

FIELD

The present invention relates to a set-up for measuring a rotational speed, in particular, of a turbocharger of a motor vehicle.

BACKGROUND INFORMATION

Conventionally, the rotational speed of rotating components in exhaust-gas turbochargers is determined using the RADAR principle. For example, German Patent Application No. DE 10 2012 200 261 A1 describes a set-up for measuring a rotational speed of a turbocharger, the set-up having a rotational speed sensor unit, which includes a radar transceiver for emitting and receiving radar waves. This receives the radar waves reflected by a machine element and makes them available as a measuring signal for an evaluation unit. The rotational speed of the turbocharger is ascertained with the aid of the evaluation unit.

SUMMARY

The present invention provides a set-up for measuring a rotational speed, in particular, of a turbocharger of a motor vehicle.

This includes at least one antenna for generating and/or receiving electromagnetic radiation and an electronic module, which includes at least one electric and/or electronic component and is electrically connected to the antenna. According to the present invention, the set-up further includes a housing shell, which is made at least partially of laser-absorbing material and includes an inner chamber and a housing cover, which abuts against at least one laser-absorbing contact surface of the housing shell and at least partially covers the inner chamber of the housing shell, and at least sections of which are made of material transparent to laser radiation; the antenna and the electronic module being situated in the inner chamber of the housing shell, and at least sections of the housing cover being welded to the housing shell at the at least one contact surface, using a laser-welded seam.

An electronic module in accordance with an example embodiment of the present invention may have an advantage that the antenna and an electronic module are situated inside a housing and are therefore protected from external stresses. In this context, the housing cover is advantageously welded to the housing shell in a simple and cost-effective manner, using laser transmission welding. If the housing cover is made of a material transparent to laser radiation, then, for the welding, the laser beam may therefore be advantageously directed through the housing cover, so that the entire contact surface may be reached by the laser beam. In this manner, the laser transmission welding produces an integral and rigid bond at the contact surface between the housing shell and the housing cover, the integral and rigid bond sealing the inner chamber of the housing shell from the outside and reliably protecting the electronic module and antenna situated in the inner chamber from external influences.

The electronic module and the antenna are formed, for example, to generate and/or receive electromagnetic radiation having a frequency of three hundred megahertz to three hundred gigahertz, in particular, for example, to generate and/or receive electromagnetic radiation having a frequency in the range of radar waves. Therefore, it may be particularly advantageous when the housing cover is made of a material which is transparent to the electromagnetic radiation generated and/or received by the antenna. Thus, in a particularly advantageous exemplary embodiment, the cover is made of a material, which is transparent to electromagnetic radiation having a frequency between three hundred megahertz and three hundred gigahertz, in particular, transparent to electromagnetic radiation having a frequency of one gigahertz to sixty gigahertz, and especially preferably transparent to electromagnetic radiation having a frequency of twenty-one gigahertz to twenty-seven gigahertz. In a particularly advantageous exemplary embodiment, the rotational speed is measured, for example, using electromagnetic radiation having a frequency of twenty-four gigahertz.

If the housing cover is formed as a plate, then there is the advantage that the housing cover may be laid flat onto a holding device, for example, directly onto an intake pipe of a turbocompressor. In addition, a cover formed as a plate may be produced particularly easily and cost-effectively and used for a multitude of different housings. In a particularly advantageous exemplary embodiment, the housing cover taking the form of a plate includes window-like depressions, in which the housing cover has a low thickness, and through which the electromagnetic radiation generated and/or received by the antenna may be advantageously transmitted with low losses.

It may be particularly advantageous for the window-like depressions to have a thickness, which corresponds to one quarter of the wavelength of the electromagnetic wave, which wavelength is generated by the transmitted and/or received electromagnetic radiation in the material of the housing cover. In this manner, the electromagnetic radiation generated and/or received by the antenna may advantageously penetrate the window-like depressions of the housing cover with low losses.

It may be particularly advantageous for the window-like depressions to be positioned relative to the antenna in such a manner, that a vertical projection of the antenna onto the housing cover lies at least partially in the depression. In this manner, it may be ensured that the electromagnetic radiation may be transmitted through the depression in the housing cover, and therefore, through the housing cover with particularly low losses.

For reasons of rigidity, it may be advantageous for the housing cover to have a thickness outside of the window-like depressions that is greater than the thickness inside the window-like depressions. In applications in which no particular demands are made on the rigidity of the housing cover, then, for reasons of simple and inexpensive production, it may be advantageous for the entire housing cover to have a thickness, which corresponds to one quarter of the wavelength of the electromagnetic wave, which is generated by the transmitted and/or received electromagnetic radiation in the material of the housing cover.

It may be particularly advantageous for the module and/or the antenna to be situated at least partially on a circuit board located in the inner chamber of the housing shell. In this manner, the electrical module may be produced together with the antenna as one component and therefore processed further in a simple and cost-effective manner.

Due to the housing cover taking the form of a plate, the housing cover may advantageously be laid flat onto a holding device. If an alignment structure is formed on the housing cover so as to be complementary to a complementary structure formed on the holding device, then this has the advantage that the housing cover, and therefore also the housing shell and the electronic module and antenna positioned in it, are aligned on the holding device in a predefined position simply by setting the housing cover onto the holding device, and consequently no longer require additional spatial adjustment.

In a particularly simple and advantageous manner, the housing cover may be aligned particularly accurately on the retention device, using at least one pin as an aligning structure or complementary structure.

In one advantageous exemplary embodiment, the spatial dimensions of the housing cover in the plane of the housing cover are greater than the spatial dimensions of the housing shell, so that the housing cover has a projection with respect to the housing shell. This has the advantage that the alignment structure may easily be mounted to the projection, and consequently, the functioning of the antenna and the electromagnetic radiation remains unaffected by the alignment structure. In addition, the projection may advantageously be used for attaching the housing cover to the holding device, for example, using a bolted joint or a clip joint.

For reasons of cost, for example, it may be particularly advantageous for the housing cover to be manufactured as a composite part including a frame part made of material transparent to laser radiation and a microwave window transparent to microwaves. Thus, in an advantageous manner, only materials transparent to laser radiation may be used for the frame part, and only materials transparent to microwaves may be used for the microwave window, and therefore, inexpensive materials may be used.

Since the cover lies flat on the holding device, a plug connector may be formed on the housing shell, and this may be situated flexibly at different positions on the housing shell. In this manner, the electronics situated in the housing shell may be electrically connected to the outside.

BRIEF DESCRIPTION OF THE DRAWINGS

Exemplary embodiments of the present invention are illustrated in the figures and are explained in greater detail in the following description.

DETAILED DESCRIPTION OF EXAMPLE EMBODIMENTS

Figure 1:
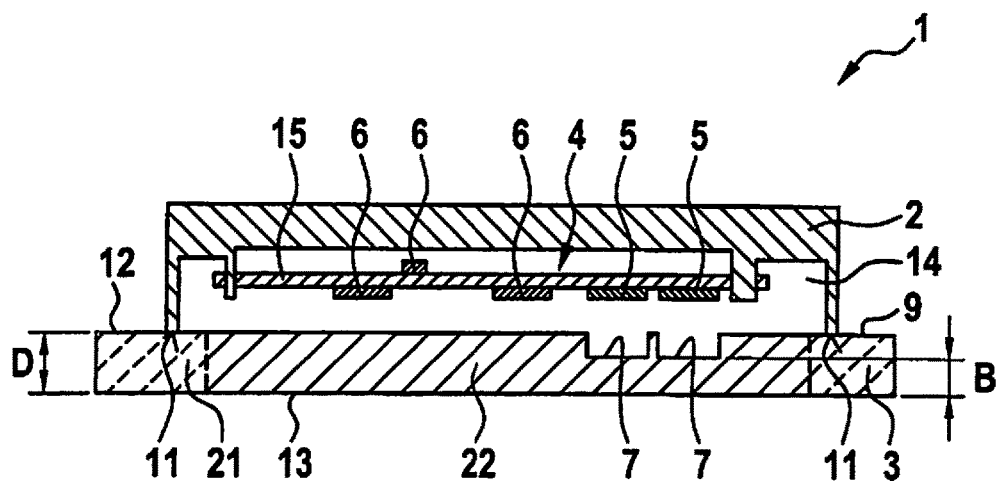
FIG. 1 shows a schematic cross section of a first exemplary embodiment of the set-up according to the present invention.

FIG. 1 shows a schematic cross-section of a first exemplary embodiment of the set-up 1 of the present invention for measuring a rotational speed; the set-up being able to be mounted, for example, in a turbocharger of a motor vehicle, e.g., directly on an intake pipe or intake tube, through which the intake air flows to the turbocharger, and there, the set-up being able to measure the rotational speed of the turbocharger. Set-up 1 includes an antenna 5 for generating and/or for receiving electromagnetic radiation. Antenna 5 may be configured, for example, to emit electromagnetic radiation having a frequency of three hundred megahertz to three hundred gigahertz, in particular, a frequency in the range of radar waves. Antenna 5 may be, for example, a rod antenna or a patch antenna and be oriented in such a manner, that the microwaves generated may propagate in the direction of a rotary part of the turbocharger. Antenna 5 generates and/or receives electromagnetic radiation in the range of radar waves, thus, for example, electromagnetic radiation having a frequency of three hundred megahertz to three hundred gigahertz. In this exemplary embodiment, the rotational speed is measured, for example, using radar waves having a frequency in the range of twenty-four gigahertz.

Electronic module 4 is electrically connected to antenna 5 and includes, for example, a control circuit and/or an evaluation circuit for generating and/or processing electromagnetic radiation.

In this exemplary embodiment, antennas 5 and electronic module 4 are situated on a circuit board 15. In the scope of the present invention, a circuit board 15 is to be understood as a plate-shaped element, which may be used as a support for electronic structures, such as circuit board conductors, terminal contacts or the like. In this exemplary embodiment, circuit board 15 may be a circuit board of type FR4 or higher grade, thus, for example, a circuit board made of fiberglass-reinforced epoxy resin. However, circuit board 15 may also be an HDI circuit board (high density interconnect circuit board), an LTCC (low temperature cofired ceramic) or another suitable circuit board 15. An electronic module 4 including one or more electric and/or electronic components 6 interconnected by circuit board conductors is situated on both sides of circuit board 15. It may involve a single electronic component 6 and/or a single antenna 5 or a plurality of electric and/or electronic components 6 electrically interconnected by circuit board conductors and/or a plurality of antennas 5.

In this exemplary embodiment, the circuit board 15 having electronic module 4 and antenna 5 is situated in inner chamber 14 of a housing shell 2, in order to protect electronic module 4 and antenna 5 from external influences. For example, using supports and pins, circuit board 15 may be attached to housing shell 2 and crimped in inner chamber 14 of housing shell 2. Circuit board 15 may be electrically contacted with other electric or electronic components present outside of the housing, such as a plug connector 8 not shown in FIG. 1 and FIG. 2, using one or more electrical connector elements not shown in FIG. 1 and FIG. 2, such as flexible circuit boards (FPC=flexible printed circuit board), cable or pressed screen.

Figure 3:
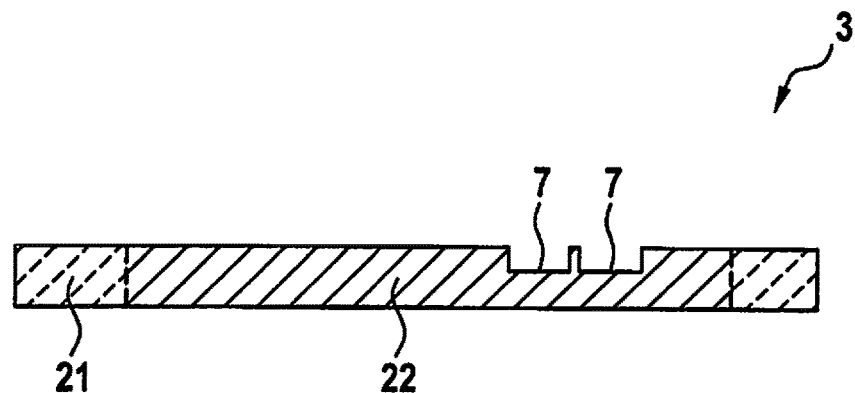
FIG. 3 shows a schematic cross section of an exemplary housing cover.
Figure 4:
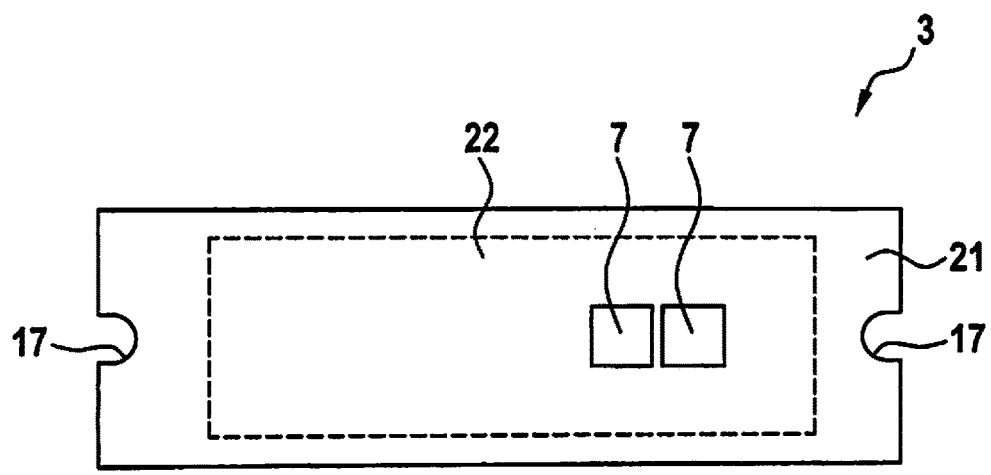
FIG. 4 shows a top view of the exemplary housing cover.

A contact surface 11, at which a housing cover 3 taking the form of, e.g., a plate of first thickness D rests against housing shell 2, is formed at housing shell 2. In this exemplary embodiment, at least sections of housing cover 3 are made of material transparent to laser radiation; housing shell 2 is made of a laser-absorbing material, at least at contact surface 11. As represented in FIG. 3 and FIG. 4, the housing cover may be made manufactured as a composite part including a frame part 21 made of a material transparent to laser radiation and at least one microwave window 22, which is set into frame part 21 and is transparent to electromagnetic radiation having a frequency of three hundred megahertz to three hundred gigahertz, in particular, to electromagnetic radiation having a frequency of one gigahertz to sixty gigahertz, and, particularly preferably, to electromagnetic radiation having a frequency of twenty-one gigahertz to twenty-seven gigahertz. In this exemplary embodiment, laser-transparent frame part 21 is in contact with laser-absorbing housing shell 2 at contact surface 11 and is welded to it at contact surface 11. Due to the laser-transparent material of frame part 21 of housing cover 3, the laser beam may be guided through housing cover 3 for welding in the region of frame part 21 at housing cover 3, and in this manner, housing cover 3 may be welded to housing shell 2 on the entire contact surface 11. In this exemplary embodiment, housing cover 3 is welded to housing shell 2 at contact surface 11 via a laser-welded seam and is therefore connected integrally to housing shell 2. Consequently, electronic module 4 and antenna 5 in inner chamber 14 of housing shell 2 are protected from external influences. Frame part 21 of housing cover 3 may be made of materials for laser transmission welding, such as PMMA (polymethyl methacrylate) or PC (polycarbonate).

Housing cover 3 may be welded to housing shell 2, using, for example, a high-speed diode laser having wavelengths in the range of approximately eight hundred to one thousand nanometer, or using a solid-state laser such as an Nd:YAG laser. Microwave window 22 may be made of material transparent to microwaves, such as PTFE (Teflon®) or PSU (polysulfone). However, housing cover 3, for example, may also not be manufactured as a composite part, but instead made throughout of a material, which is transparent to laser radiation and simultaneously transparent to electromagnetic radiation having a frequency of three hundred megahertz to three hundred gigahertz, in particular, transparent to electromagnetic radiation having a frequency of one gigahertz to sixty gigahertz, and especially preferably transparent to electromagnetic radiation having a frequency of twenty-one gigahertz to twenty-seven gigahertz. Consequently, in this exemplary embodiment, housing cover 3 is transparent to the electromagnetic radiation of twenty-four gigahertz emitted and/or received by antenna 5.

In one exemplary embodiment, it is provided that housing cover 3 take the form of a plate of a first thickness D and have window-like depressions 7 of a second thickness B, which corresponds to one quarter of the wavelength of the electromagnetic wave, which is generated by an electromagnetic wave having a frequency, for example, between twenty-one gigahertz and twenty-seven gigahertz in the material of housing cover 3. In principle, at least slight deviations from the plate shape are also considered for the housing cover 3 and shall also be included conceptually. In this exemplary embodiment, antennas 5 emit and/or receive electromagnetic radiation having a frequency of twenty-four gigahertz. If second thickness B of housing cover 3 in window-like depressions 7 corresponds to one quarter of the wavelength of the electromagnetic radiation to be transmitted in the material of housing cover 3, then the radiation is transmitted with particularly low losses. In this exemplary embodiment, outside of window-like depressions 7, housing cover 3 has a first thickness D greater than second thickness B. If, for example, the electromagnetic radiation is directed through housing cover 3, with low losses, in window-like depressions 7, then, outside of these regions, housing cover 3 may have, for example, a greater, first thickness D, which produces an improved rigidity of housing cover 3. However, if this increased rigidity is not necessary, then, for example, housing cover 3 may also have one thickness throughout, which corresponds to one quarter of the wavelength of the electromagnetic radiation to be transmitted in the material of housing cover 3.

In this exemplary embodiment, in order to ensure particularly efficient transmission of the electromagnetic radiation emitted and/or received by antenna 5, window-like depressions 7 are formed in the housing cover 3 in such a manner, that a vertical projection of antennas 5 onto the plane of housing cover 3 lies in depressions 7. In this manner, a particularly short path of the electromagnetic radiation from antennas 5 to window-like depressions 7 is ensured.

Figure 2:
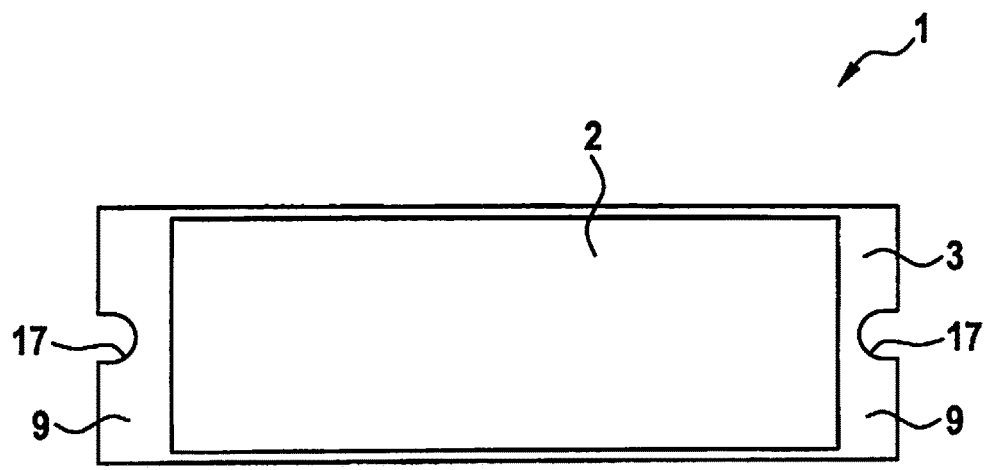
FIG. 2 shows a top view of the first exemplary embodiment of the set-up according to the present invention.
Figure 5:
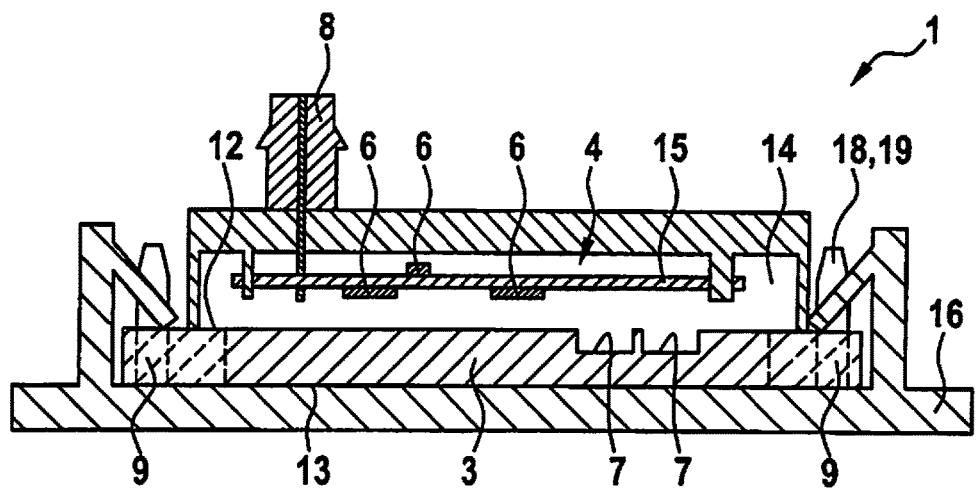
FIG. 5 shows a schematic cross section of a second exemplary embodiment of the set-up according to the present invention.

FIG. 2 shows a top view of the first exemplary embodiment of set-up 1 of the present invention, including the housing cover 3 laser-welded to housing shell 2. In this exemplary embodiment, the spatial dimensions of housing cover 3 in the plane of the housing cover 3 taking the form of a plate are greater than the spatial dimensions of housing shell 2, which means that housing cover 3 has a projection 9 with respect to housing shell 2. In this exemplary embodiment, projection 9 is formed in one piece and encircles entire housing shell 2, but, for example, it may also be formed to have multiple sections. As shown in FIG. 5, housing cover 3 may be placed on a holding device 16 and aligned on it in a predetermined position. For this purpose, an alignment structure 17 may be formed, for example, in projection 9, in a manner complementary to a complementary structure 18 formed on holding device 16, so that by engagement of alignment structure 17 with complementary structure 18, housing cover 3 is aligned on holding device 16 in a predetermined position. In this exemplary embodiment, alignment structure 17 is formed in the shape of semicircular cut-outs in projection 9 of housing cover 3. However, alignment structure 17 may also be formed in any other shape, which is useful for aligning housing cover 3 in a predetermined position. For example, alignment structure 17 may also be formed on a part of housing cover 3 not constituting projection 9 of housing cover 3.

Figure 6:
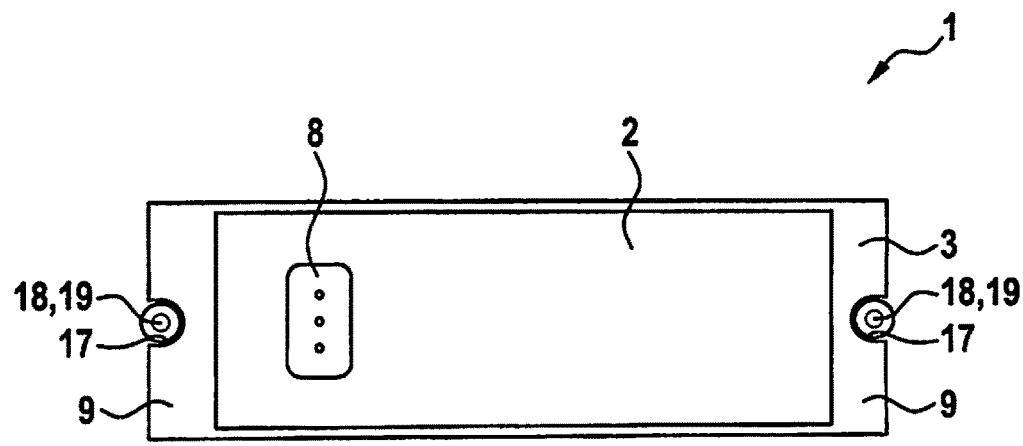
FIG. 6 shows a top view of the second exemplary embodiment of the set-up according to the present invention.

FIG. 5 shows a schematic cross section of a second exemplary embodiment of set-up 1 according to the present invention. Besides the circuit board 15 having antenna 5 and electronic module 4 in inner chamber 14 of housing shell 2, and the housing cover 3 laser-welded to housing shell 2, this exemplary embodiment includes a holding device 16. Housing cover 3 is placed onto holding device 16 and aligned on it in a predetermined position. FIG. 6 shows a top view of the second exemplary embodiment of set-up 1 according to the present invention. For example, two pins 19 used as a complementary structure 18 are formed on holding device 16. Accordingly, alignment structure 17 is formed to be complementary, for example, as semicircular cut-outs in the projection 9 of housing cover 3 past housing shell 2.

The engagement of pins 19 with semicircular cut-outs upon placement of housing cover 3 onto holding device 16 allows housing cover 3 to be aligned in a predetermined position on holding device 16, the position being suitable for the specific purpose, for example, the measurement of the rotational speed of a turbocharger. In principle, alignment structure 17 and complementary structure 18 may also be formed in a multitude of other shapes, which allow housing cover 3 to be aligned on holding device 16 in a predetermined position. For example, the complementary structure 18 formed on holding device 16 may also be manufactured to be complementary to the alignment structure 17 formed on housing cover 3. Thus, for instance, holding device 16 may also be an intake tube of a turbocompressor, which is manufactured to be complementary to the alignment structure 17 formed on housing cover 3. For example, the intake tube may be shaped by heating into a form, for example, in such a manner, that a complementary structure 18 complementary to the alignment structure 17 formed on housing cover 3 is formed on it.

For example, as shown clearly in FIG. 5, housing cover 3 may be mechanically attached to holding device 16, using a clip device, which is formed on holding device 16 and has detent hooks that grip projection 9 from behind. In addition, e.g., housing cover 3 may also be laser-welded to holding device 16, which may be an intake tube or an intake pipe of a turbocompressor, for example. Furthermore, housing cover 3 may also be attached to holding device 16, for example, using a bolted joint, an adhesive joint, or using any other suitable connection technique.

Of course, even more exemplary embodiments and combined forms of the described exemplary embodiments are possible.

What is claimed is:

1. A set-up for measuring a rotational speed of a turbocharger of a motor vehicle, comprising:
    at least one antenna for at least one of generating and receiving electromagnetic radiation;
    an electronic module that includes at least one of an electric and electronic component, the electronic module being electrically connected to the antenna;
    a housing shell that is made at least partially of laser-absorbing material and that includes an inner chamber in which the at least one antenna and the electronic module are situated; and
    a housing cover having a first side that:
        at least partially covers the inner chamber of the housing shell; and
        abuts against a laser-absorbing contact surface of the housing shell at a location at which the housing cover is made of material that is transparent to laser radiation and at which the housing cover is welded to the laser-absorbing contact surface with a laser-welded seam;
    wherein at least one of the following:
        at least a portion of the housing cover has a first thickness that is one quarter of a wavelength of an electromagnetic wave at least one of (a) that the antenna is configured to at least one of transmit and receive through the housing cover, (b) to which the at least the portion of the housing cover is transparent, and (c) that is between twenty-one gigahertz and twenty-seven gigahertz; and
        the housing cover includes a plate with at least one window-like depression at which the plate is reduced in thickness, and the window-like depression and the antenna are positioned relative to each other such that at least one of (a) at least a portion of a transmitting or receiving surface of the antenna faces the depression and (b) a projection of the antenna, in a direction that is perpendicular to a transmitting or receiving surface of the antenna, onto the first side of the housing cover lies at least partially in the depression.

2. The set-up as recited in claim 1, wherein the housing cover further includes a region made of a material that is transparent to electromagnetic radiation having a frequency that is in a frequency range of three hundred megahertz to three hundred gigahertz.

3. The set-up as recited in claim 1, wherein the housing cover further includes a region made of a material that is transparent to electromagnetic radiation having a frequency that is in a frequency range of one gigahertz to sixty gigahertz.

4. The set-up as recited in claim 1, wherein the housing cover further includes a region made of a material that is transparent to electromagnetic radiation having a frequency that is in a frequency range of twenty-one gigahertz to twenty-seven gigahertz.

5. The set-up as recited in claim 1, wherein the housing cover is formed as a plate having the first side facing the housing shell and a second side facing away from the housing shell, the plate having a second thickness, and wherein the housing cover has the at least one window-like depression at which the plate thickness is less than the second thickness.

6. The set-up as recited in claim 5, wherein, in the depression, the plate has the first thickness, the first thickness being one quarter of wavelength of the electromagnetic wave having the frequency that is between twenty-one gigahertz and twenty-seven gigahertz.

7. The set-up as recited in claim 5, wherein the depression and the antenna are positioned relative to each other such that the projection of the antenna, in the direction that is perpendicular to the transmitting or receiving surface of the antenna, onto the first side of the housing cover lies at least partially in the depression.

8. The set-up as recited in claim 1, wherein the housing cover has the portion having the first thickness that is one quarter of the wavelength of the electromagnetic wave having frequency that is between twenty-one gigahertz and twenty-seven gigahertz.

9. The set-up as recited in claim 1, further comprising:
    in the inner chamber of the housing shell, at least one circuit board on which is situated one or both at least one of: i) the at least one antenna and ii) the electronic module.

10. The set-up as recited in claim 1, further comprising:
    a holding device, wherein a second side of the housing cover is on the holding device on an intake pipe of a turbocharger of a motor vehicle, and an alignment structure is formed on the housing cover so as to be complementary to a complementary structure formed on the holding device, so that by engagement of the alignment structure with the complementary structure, the housing cover is aligned on the holding device in a predetermined position.

11. The set-up as recited in claim 10, wherein one of the alignment structure or the complementary structure includes at least one pin.

12. The set-up as recited in claim 1, wherein spatial dimensions of the first side of the housing cover in first and second directions are greater than spatial dimensions of the housing shell in the first and second directions, so that the housing cover has at least one projection with respect to the housing shell.

13. The set-up as recited in claim 1, wherein the housing cover is manufactured as a composite part including a frame part made of the material transparent to laser radiation and at least one microwave window, which is set into the frame part and is transparent to electromagnetic radiation having a frequency that is in a frequency range of three hundred megahertz to three hundred gigahertz.

14. The set-up as recited in claim 1, wherein the housing cover is manufactured as a composite part including a frame part made of the material transparent to laser radiation and at least one microwave window, which is set into the frame part and is transparent to electromagnetic radiation having a frequency that is in a frequency range of one gigahertz to sixty gigahertz.

15. The set-up as recited in claim 1, wherein the housing cover is manufactured as a composite part including a frame part made of the material transparent to laser radiation and at least one microwave window, which is set into the frame part and is transparent to electromagnetic radiation having a frequency that is in a frequency range of twenty-one gigahertz to twenty-seven gigahertz.

16. The set-up as recited in claim 1, wherein at least one plug connector is formed on the housing shell.

17. A method for manufacturing a set-up for measuring a rotational speed of a turbocharger of a motor vehicle, the method comprising:
    providing a housing shell;
    positioning in an inner chamber of the housing shell an antenna for at least one of generating and receiving electromagnetic radiation and an electronic module that includes at least one electronic component electrically connected to the antenna;
    placing a housing cover relative to the housing shell so that a first side of the housing cover, facing towards the housing shell, at least partially covers the inner chamber and abuts against a laser-absorbing contact surface of the housing shell at a location at which the housing cover is made of material that is transparent to laser radiation; and
    welding the housing shell to the housing cover at the contact surface by guiding a laser beam through the housing cover;
    wherein at least one of the following:
        at least a portion of the housing cover has a first thickness that is one quarter of a wavelength of an electromagnetic wave at least one of (a) that the antenna is configured to at least one of transmit and receive through the housing cover, (b) to which the at least the portion of the housing cover is transparent, and (c) that is between twenty-one gigahertz and twenty-seven gigahertz; and
        the housing cover includes a plate with at least one window-like depression at which the plate is reduced in thickness, and, subsequent to the welding, the window-like depression and the antenna are positioned relative to each other such that at least one of (a) at least a portion of a transmitting or receiving surface of the antenna faces the depression and (b) a projection of the antenna, in a direction that is perpendicular to a transmitting or receiving surface of the antenna, onto the first side of the housing cover lies at least partially in the depression.

18. The method as recited in claim 17, wherein the material of the housing cover is transparent to electromagnetic radiation having a frequency that is in a frequency range of three hundred megahertz to three hundred gigahertz.

19. The method as recited in claim 17, wherein the material of the housing cover is transparent to electromagnetic radiation having a frequency that is in a frequency range of one gigahertz to sixty gigahertz.

20. The method as recited in claim 17, wherein the material of the housing cover is transparent to electromagnetic radiation having a frequency that is in a frequency range of twenty-one gigahertz to twenty-seven gigahertz.

21. The set-up as recited in claim 1, wherein the housing cover includes the portion that has the first thickness, the first thickness being one quarter of a wavelength of an electromagnetic wave that the antenna is configured to at least one of transmit and receive through the housing cover.

22. The set-up as recited in claim 1, wherein the housing cover includes the portion that has the first thickness, the first thickness being one quarter of the wavelength of the electromagnetic wave to which the portion of the housing cover is transparent.

23. The set-up as recited in claim 1, wherein the housing cover includes the plate with the at least one window-like depression at which the plate is reduced in thickness, and the window-like depression and the antenna are positioned relative to each other such that the at least the portion of the transmitting or receiving surface of the antenna faces the depression.

* * * * *